US009502728B1

(12) United States Patent
Farooque et al.

(10) Patent No.: US 9,502,728 B1
(45) Date of Patent: Nov. 22, 2016

(54) HIGH-EFFICIENCY MOLTEN CARBONATE FUEL CELL SYSTEM WITH CARBON DIOXIDE CAPTURE ASSEMBLY AND METHOD

(71) Applicant: FUELCELL ENERGY, INC., Danbury, CT (US)

(72) Inventors: Mohammad Farooque, Marlboro, NJ (US); Carla Juhas, Bethlehem, CT (US); Ramakrishnan Venkataraman, Danbury, CT (US)

(73) Assignee: FUELCELL ENERGY, INC., Danbury, CT (US)

( * ) Notice: Subject to any disclaimer, the term of this patent is extended or adjusted under 35 U.S.C. 154(b) by 0 days.

(21) Appl. No.: 14/732,032

(22) Filed: Jun. 5, 2015

(51) Int. Cl.
| | | |
|---|---|---|
| *H01M 8/04* | (2016.01) | |
| *H01M 8/06* | (2016.01) | |
| *H01M 8/24* | (2016.01) | |

(52) U.S. Cl.
CPC ....... *H01M 8/0668* (2013.01); *H01M 8/04089* (2013.01); *H01M 8/04753* (2013.01); *H01M 8/04902* (2013.01); *H01M 8/0612* (2013.01); *H01M 8/249* (2013.01)

(58) Field of Classification Search
None
See application file for complete search history.

(56) References Cited

U.S. PATENT DOCUMENTS

| | | | | |
|---|---|---|---|---|
| 5,518,828 A * | 5/1996 | Senetar | ............. | H01M 8/04089 429/439 |
| 8,062,799 B2 * | 11/2011 | Jahnke | ............. | H01M 8/04291 429/415 |
| 2004/0166384 A1 * | 8/2004 | Schafer | ............. | H01M 8/04097 429/444 |
| 2005/0271914 A1 * | 12/2005 | Farooque | ............ | H01M 8/0612 429/410 |
| 2007/0111054 A1 * | 5/2007 | Gottmann | ......... | H01M 8/04007 429/425 |
| 2008/0241638 A1 | 10/2008 | McElroy et al. | | |
| 2008/0299425 A1 * | 12/2008 | Kivisaari | .......... | H01M 8/04097 429/441 |
| 2013/0014484 A1 * | 1/2013 | Caprile | ............... | H01M 8/0618 60/39.182 |

FOREIGN PATENT DOCUMENTS

WO WO-2012/176176 A1 12/2012

OTHER PUBLICATIONS

International Preliminary Report on Patentability for application PCT/US2016/035745 dated Sep. 30, 2016 (10 pages).

* cited by examiner

*Primary Examiner* — Jonathan Crepeau
(74) *Attorney, Agent, or Firm* — Foley & Lardner LLP

(57) ABSTRACT

A high efficiency fuel cell system adapted to receive flue gas from a flue gas generating device and to capture carbon dioxide from the flue gas, the high efficiency fuel cell system comprising a topping fuel cell assembly comprising a topping cathode portion and a topping anode portion, a bottoming fuel cell assembly comprising a bottoming cathode portion and a bottoming anode portion, wherein the bottoming anode portion receives anode exhaust output from the topping anode portion, and a separation assembly configured to receive carbon dioxide-containing exhaust and to separate carbon dioxide from the carbon dioxide-containing exhaust, wherein the carbon dioxide-containing exhaust is one of anode exhaust output from the bottoming anode portion and a gas derived from the anode exhaust output from the bottoming anode portion, and wherein at least one of the topping cathode portion and the bottoming cathode portion receives at least a portion of the flue gas output from the flue gas generating device.

30 Claims, 2 Drawing Sheets

HIGH-EFFICIENCY MOLTEN CARBONATE FUEL CELL SYSTEM WITH CARBON DIOXIDE CAPTURE ASSEMBLY AND METHOD

BACKGROUND OF THE INVENTION

This invention relates to fuel cell power production systems and, in particular, to a multi-stack high-efficiency fuel cell system with carbon dioxide capture capability and method of operating same. The systems of the present invention may be used with any types of fuel cells, and particularly with molten carbonate fuel cells and solid oxide fuel cells.

World energy consumption is increasing with average energy use growing at about 1.1% per year until 2040 according to the IEA (International Energy Agency). Currently, over 85% of the energy is supplied from fossil fuels. Fossil fuels used for electricity, transportation and heating require combustion, resulting in carbon dioxide emissions into earth's atmosphere. The carbon dioxide concentration in the atmosphere has almost doubled since humans started using fossil fuels and increasing carbon dioxide concentrations in the atmosphere is considered to be a major cause of global warming trends. In fact, the world is on a track to increase total carbon dioxide in the atmosphere by 20% by 2040, resulting in a projected global temperature rise of 3.6 C. Sustainable and efficient use of fossil fuels, as well as capture of emitted carbon dioxide will help to slow the increase of carbon dioxide concentrations in earth's atmosphere. Development of fuel cells, which output lower levels of emissions, as an alternative method of heat and electricity production to conventional fossil fuel-based combustion power plants is ongoing.

A fuel cell is a device which directly converts chemical energy stored in hydrocarbon fuel into electrical energy by means of an electrical reaction. Generally, a fuel cell comprises an anode and a cathode separated by an electrolyte matrix, which conducts electrically charged ions. In order to produce a useful power level, a number of individual fuel cells are stacked in series with an electrically conductive separator plate between each cell.

In building fuel cell systems, individual fuel cells are stacked together to form a fuel cell stack. The number of fuel cells determines the power rating of the fuel cell stack. To provide systems with higher power ratings, a number of fuel cell stacks are utilized and the outputs of the fuel cell stacks are combined to provide the desired power output. In certain fuel cell systems, the fuel cell stack(s) may be organized in one or more fuel cell stack modules, each of which includes one or more fuel cell stacks housed in an enclosure or a containment structure.

A multi-stack fuel cell system may include a fuel cell stack module with multiple fuel cell stacks housed within a common enclosure. In a system of this design developed for high temperature fuel cell stacks and, in particular, for molten carbonate fuel cell stacks, a box-like containment structure is employed as the enclosure and the fuel cell stacks may be arranged along the length of the containment structure. Each fuel cell stack within the fuel cell module may have inlet manifolds for receiving fuel and oxidant gases needed to operate the fuel cell stack and outlet manifolds for conveying spent fuel and oxidant gases as anode and cathode exhausts from the fuel cell stack. The containment structure of the fuel cell module includes fuel and oxidant gas inlet ports that communicate through ducts with the respective fuel and oxidant gas inlet manifolds of the fuel cell stacks, and fuel and oxidant gas outlet ports that communicate through ducts with the oxidant and fuel gas outlet manifolds. Alternative arrangement of fuel cell stacks within a containment structure that does not require inlet and outlet manifolds is described in U.S. Pat. No. 8,962,210, assigned to the same assignee herein.

In internally reforming fuel cells, a reforming catalyst is placed within the fuel cell stack to allow direct use of hydrocarbon fuels such as pipe line natural gas, liquefied natural gas (LNG), liquefied petroleum gas (LPG), bio-gas, methane containing coal gas, etc. without the need for expensive and complex external reforming equipment. In an internal reformer, water and heat produced by the fuel cell are used by the reforming reaction, and hydrogen produced by the reforming reaction is used in the fuel cell. The heat produced by the fuel cell reaction supplies heat for the endothermic reforming reaction. Thus, internal reforming is used to cool the fuel cell stack.

Two different types of internally reforming fuel cell designs have been developed and used. The first type of an internally reforming fuel cell is a Direct Internally Reforming (DIR) fuel cell module, in which direct internal reforming is accomplished by placing the reforming catalyst within an active anode compartment of the fuel cell. A second type of internally reforming fuel cell utilizes Indirect Internal Reforming (IIR), which is accomplished by placing the reforming catalyst in an isolated chamber within the fuel cell stack and routing the reformed gas from this chamber into the anode compartment of the fuel cell. An internally reforming molten carbonate fuel cell system, also called Direct Fuel Cell (DFC), incorporating both the DIR and IIR, has evolved as the choice for environmentally friendly power generation and is the leading commercial option for green power. Carbonate power plants have lower emissions of greenhouse gases and particulate matter than conventional combustion-based power plants. Carbonate power plants emit little NOx gas, SOx gas, or particulate matter. Carbonate power plants have been designated "ultra-clean" by the California Air Resources Board (CARB).

SUMMARY OF THE INVENTION

It is an objective of the present invention to provide a high efficiency system including fuel cells for utilizing flue gas output from a flue gas producing system and for outputting exhaust gas from which carbon-dioxide can be easily separated and captured. More particularly, the present invention provides a fuel cell system that utilizes flue gas output from a flue gas producing system and which provides for separation and transfer of CO2 from the flue gas to produce a CO2-rich gas stream with CO2 concentrations approaching 90% on dry basis.

It is also an objective of the present invention to provide a cost-effective, modular fuel cell system, in which overall fuel utilization of 80% or greater and electrical and conversion system efficiency of 55% or greater are achieved while maintaining thermal balance within the fuel cells.

It is also a further objective of the present invention to provide a fuel cell system that utilizes between about 80% and 100% of the fuel provided to the system.

It is yet a further objective of the present invention to provide a fuel cell system in which partially spent fuel from the exhaust of a topping fuel cell module(s) is supplied to a bottoming fuel cell module(s).

It is also a further objective of the present invention to provide a controller for a fuel cell system that balances the pressure between a cathode portion and an anode portion of a fuel cell module(s) to eliminate the need for an anode pressure booster and/or a cathode pressure booster.

It is still yet a further objective of the present invention to provide a controller for a fuel cell system that adjusts carbon dioxide utilization to greater than 90%, while maintaining high electrical output in a topping fuel cell module(s) and a bottoming fuel cell module(s).

These and other objectives are achieved by a high efficiency fuel cell system that includes topping fuel cell stack(s) and bottoming fuel cell stack(s) and that has high fuel utilization during operation and provides for efficient concentration and separation of CO2 from anode exhaust of the bottoming fuel cell stack(s). The present invention has two possible configurations for efficient CO2 concentration and separation from the exhaust of the high efficiency fuel cell system. In one configuration of the system, flue gas from a flue gas generating device, such as a fossil fueled power plant or a chemical process plant, is partially or entirely fed to the cathodes of the system as inlet oxidant gas, with or without additional supplemental air. The fuel cells of this system are molten carbonate fuel cells and a significant part of the CO2 present in the flue gas is transported to the anode side by the electrochemical fuel cell reaction and combined with the CO2 already present in the fuel. The highly concentrated CO2 present in anode exhaust output from the bottoming fuel cell stacks is separated in a separation assembly and output for storage or for use in another process. The remaining CO2-depleted anode exhaust can be recycled as fuel to the fuel cell or used for heat generation or in another chemical process.

In another configuration of the system, air from outside or dried air is fed to the cathodes of the system as inlet oxidant gas. The fuel cells of this system configuration can be solid oxide fuel cells. Alternatively, phosphoric acid fuel cells or any other type of fuel cells may be used in this system configuration. In this configuration, CO2 concentration is very high in the anode exhaust of the bottoming fuel cell stack(s) due to the high fuel utilization (about 80% or greater), and the CO2 present in the anode exhaust is separated by a separation assembly and output for storage or for use in another process. The remaining CO2-depleted exhaust can be recycled as fuel to the fuel cell or used for heat generation or in another chemical process.

Some embodiments of the present invention are characterized by a high efficiency fuel cell system adapted to receive flue gas from a flue gas generating device and to capture carbon dioxide from the flue gas, the high efficiency fuel cell system comprising: a topping fuel cell assembly comprising a topping cathode portion and a topping anode portion; a bottoming fuel cell assembly comprising a bottoming cathode portion and a bottoming anode portion, wherein the bottoming anode portion receives anode exhaust output from the topping anode portion; and a separation assembly configured to receive carbon dioxide-containing exhaust and to separate carbon dioxide from the carbon dioxide-containing exhaust. In the system, the carbon dioxide-containing exhaust is one of anode exhaust output from the bottoming anode portion and a gas derived from the anode exhaust output from the bottoming anode portion, and at least one of the topping cathode portion and the bottoming cathode portion receives at least a portion of the flue gas output from the flue gas generating device.

In the system of the present invention, the topping cathode portion and the bottoming cathode portion each receive a portion of the flue gas output from the flue gas generating device in parallel. Alternatively, one of the topping cathode portion and the bottoming cathode portion receives at least a portion of the flue gas output from the flue gas generating device and generates cathode exhaust, and the other one of the topping cathode portion and the bottoming cathode portion receives the cathode exhaust generated by the one of the topping cathode portion and the bottoming cathode portion. For example, the topping cathode portion receives at least a portion of the flue gas output from the flue gas generating device and generates cathode exhaust, and the bottoming cathode portion receives the cathode exhaust generated by the topping cathode portion. In some embodiments, the topping cathode portion and the bottoming cathode portion are adapted to receive the flue gas in parallel or in series, and the system further comprises a controller for controlling the flow of the flue gas to the topping cathode portion and the bottoming cathode portion to be in parallel or in series.

In some embodiments, the carbon dioxide-containing exhaust is anode exhaust output from the bottoming anode portion, the separation assembly outputs separated carbon dioxide and separately outputs separated anode exhaust with a reduced amount of carbon dioxide, and the separated anode exhaust is recycled to the topping anode portion for use as fuel. The system may also include a conduit and a flow control member for bleeding off a small amount of the separated anode exhaust to remove inert gases prior to recycling the remaining separated anode exhaust to the topping anode portion.

In some embodiments, the system further comprises an oxidizer assembly for oxidizing anode exhaust output from the bottoming anode portion with one or more of air and oxygen to generate the carbon dioxide-containing exhaust and to generate waste heat for heating the flue gas before the flue gas is provided to the at least one of the topping and bottoming cathode portions, and the separation assembly outputs separated carbon dioxide and separately outputs a separated gas with a reduced amount of carbon dioxide.

In certain embodiments, the separation assembly comprises: a condenser for cooling the carbon dioxide-containing exhaust to separate water from the carbon dioxide-containing exhaust and to output a water separated carbon dioxide containing exhaust, and a carbon dioxide separator for separating carbon dioxide from the water separated carbon dioxide-containing exhaust to output a separated gas with a reduced carbon dioxide content and to separately output carbon dioxide suitable for one or more of sequestration and external use. The carbon dioxide separator separates the carbon dioxide using one or more of compression and cryogenic cooling to generate liquid carbon dioxide, solvent washing, and a membrane process.

The system further comprises a controller. In some embodiments, the controller controls the flow rate of the flue gas to the one or more of the topping cathode portion and bottoming cathode portion to support a fuel cell cathode side electrochemical reaction in each of the topping and bottoming fuel cell assemblies and to achieve a predetermined overall CO2 utilization. The predetermined overall CO2 utilization is 50% or greater, and in some embodiments 85% or greater. In some embodiments, the controller controls the flow rates of flue gas and fuel through the topping fuel cell assembly and bottoming fuel cell assembly so that pressures between the topping anode portion and the topping cathode portion are balanced and the pressures between the bottoming anode portion and the bottoming cathode portion are balanced. In some embodiments, the bottoming anode portion receives supplemental fuel, and the controller controls the amount of supplemental fuel conveyed to the bottoming anode portion, wherein the controller controls the amount of current generated in the bottoming fuel cell assembly by controlling the amount of supplemental fuel conveyed to the bottoming anode portion. In certain embodiments, the controller controls one or more of:

(a) the amount of current generated in the topping and bottoming fuel cell assemblies so that as operating time of the high efficiency fuel cell system increases, the amount of current generated by the topping fuel cell assemblies decreases and the amount of current generated by the bottoming fuel cell assemblies increases;

(b) the amount of current generated in the bottoming fuel cell assembly based on electricity needs so that the amount of current generated in the bottoming fuel cell assembly is increased when the electricity need increases;

(c) the flow of the flue gas to be conveyed to the topping fuel cell assembly and to the bottoming fuel cell assembly in parallel or in series;

(d) the flow rate of flue gas to the topping fuel cell assembly and to the bottoming fuel cell assembly to achieve a predetermined overall CO2 utilization;

(e) the pressure between the topping fuel cell module and the bottoming fuel cell module such that the pressure is balanced;

(f) the amount of fuel feed provided to each of the first and second topping fuel cell modules;

(g) the amount of supplemental fuel provided to the bottoming fuel cell assembly;

(h) recycling of separated exhaust output from the separation assembly to the topping anode portion; and (i) the amount of supplemental air supplied to one or more of the topping cathode portion and the bottoming cathode portion so as to control the temperature and concentration of carbon dioxide in a cathode inlet gas conveyed to the one or more of the topping cathode portion and the bottoming cathode portion.

In certain embodiments, the topping fuel cell assembly has a greater number of fuel cells than the bottoming fuel cell assembly so that the topping fuel cell assembly utilizes more fuel than the bottoming fuel cell assembly, and wherein overall fuel utilization by the high fuel cell system is 80% or greater.

In certain embodiments, high efficiency fuel cell system will use fresh or dried fresh air in the topping and bottom cathodes instead of receiving and using flue gas from a flue gas generating device. In this mode of operation, the exhaust from the anodes of the bottoming fuel cells is conveyed to a gas separation assembly where carbon dioxide and water are separated from the unutilized fuel. Separated carbon dioxide can be sequestered or used for other applications. The separated unutilized fuel, with reduced carbon dioxide and water can be pressurized and combined with the fuel feed to the topping module. The fuel cells in this system would be solid oxide fuel cells. However, this system may also be used with other types of fuel cells, including phosphoric acid fuel cells.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
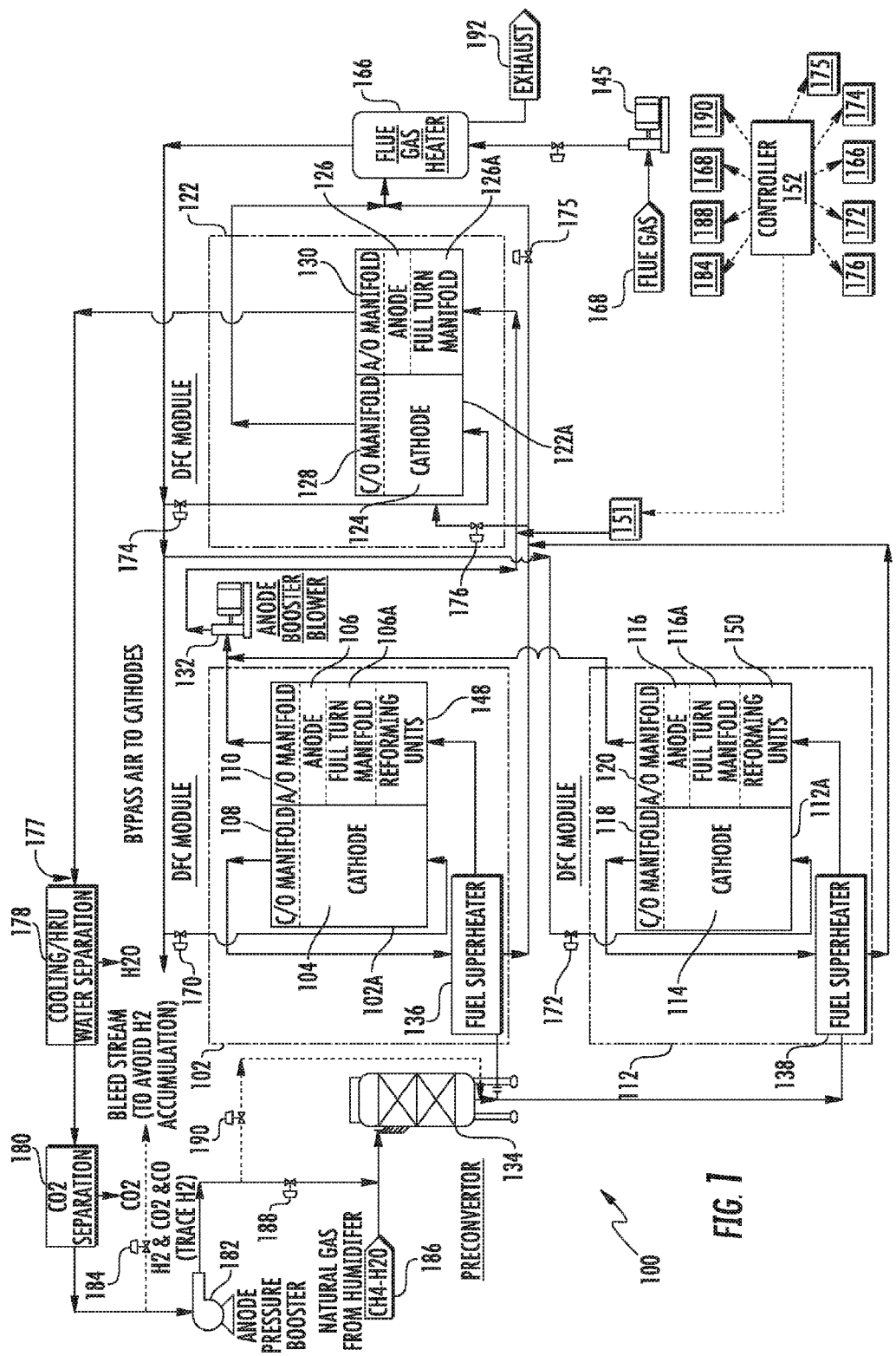
FIG. 1 shows a high efficiency fuel cell system including a first topping fuel cell module, a second topping fuel cell module, a bottoming fuel cell module, and a carbon capture assembly.

As shown and described below, the present invention provides a cost-effective, modular fuel cell system, in which capture of excess carbon dioxide is achieved while maintaining higher overall fuel utilization, higher electrical power output and improved conversion system efficiency. In accordance with the present invention, the fuel cell system includes a plurality of fuel cell stacks or a plurality of fuel cell stack modules including one or more topping stack(s) or topping stack module(s) and one or more bottoming stack(s) or bottoming stack module(s), and wherein the one or more topping stack(s)/module(s) receive fresh fuel and partially spent fuel from the exhaust of the one or more topping fuel cell stack(s)/module(s) is supplied to the one or more bottoming fuel cell stack(s)/module(s). The fuel cell system also receives and utilizes carbon dioxide-containing flue gas output from one or more flue gas generating devices as inlet oxidant gas, which can be provided to the cathodes of the one or more topping stack(s)/module(s) and/or one or more bottoming stack(s)/module(s) in parallel or in series. During the electrochemical reactions in the fuel cell stacks of the system, most of the carbon dioxide contained in the flue gas is extracted and output with anode exhaust from the bottoming fuel cell stack(s)/module(s). In the present invention, anode exhaust from the bottoming fuel cell stack(s)/module(s) is conveyed to a carbon dioxide capture assembly, where carbon dioxide is separated and captured, and a remaining gas stream comprising unused fuel may be mixed with fresh fuel and supplied to the one or more topping fuel cell stack(s)/module(s). In certain alternative embodiments, anode exhaust from the bottoming fuel cell stack(s)/module(s) is oxidized in an anode exhaust oxidizer (AGO) and thereafter conveyed to a carbon dioxide capture assembly, where carbon dioxide is separated from the AGO exhaust and stored away or used externally. In both embodiments of the present invention, up to 90% of carbon dioxide fed to the system could be separated and concentrated in the anode exhaust, and the carbon dioxide is separated from the anode exhaust for capture and sequestration. Moreover, the carbon dioxide utilization in the topping and bottoming fuel cell stack(s)/module(s) is controlled and adjusted to maintain the overall carbon dioxide utilization of 50% or greater and in some embodiments 85% or greater, or approaching 90%, while still maintaining high voltages in the topping and bottoming fuel cell stack(s)/module(s).

In the configuration of the system of the present invention, fuel utilization in the topping and bottoming fuel cell stacks/modules are controlled within desired limits while still increasing the overall fuel utilization and electrical efficiency of the system. Specifically, the size of the topping fuel cell stack(s)/module(s) and the fuel utilized are made greater than the size of the bottoming fuel cell stack(s)/module(s). In certain embodiments of the invention, the system includes a topping fuel cell stack or module with two or more stacks and a bottoming fuel cell stack or module with two or more stacks, wherein the topping fuel cell stack has a greater number of fuel cells stacked in series than the bottoming fuel cell stack so that the topping stack utilizes more fuel in the fuel feed than the bottoming stack. In other embodiments of the invention, the system includes multiple topping fuel cell modules and one or more bottoming fuel cell modules, wherein each fuel cell module comprises one or more fuel cell stacks, and the number of topping fuel cell modules is greater than the number of bottoming fuel cell modules. In some embodiments, the topping fuel cell stack/modules consume about two thirds of the fuel and the bottoming fuel cell stack(s)/module(s) consume the remaining about one third of the fuel in the fuel feed. The bottoming fuel cell stack(s)/module(s) may receive additional fresh fuel, which may be dry fuel or may be premixed with water vapor. In addition, the current density in the bottoming fuel cell stack(s)/module(s) is lower than the current density in the topping fuel cell stack/modules.

In the present invention, current generated in the topping stack(s)/module(s) and in the bottoming stack(s)/module(s) may be controlled over operating time of the system. Specifically, over time, current generated in the topping stack(s)/module(s) may be reduced while current generated in the bottoming stack(s)/module(s) is increased. In the bottoming stack(s)/module(s), current generated is changed based on the amount of methane or other fresh fuel supplied to the bottoming stack(s)/module(s). Moreover, current generated in the bottoming stack(s)/module(s) may be adjustable to adapt to customer needs for heat and electricity. For example, when the customer need for electricity is greater, the output of the bottoming stack(s)/module(s) may be increased. In addition, the oxidizer that oxidizes anode exhaust conveyed from the bottoming stack(s)/module(s) may include design features that allow the processing of the anode exhaust from the bottoming stack(s)/module(s) at various output levels of the bottoming module. For example, when the bottoming stack(s)/module(s) generate less power, there will be more excess fuel supplied in the anode exhaust to the anode exhaust oxidizer, and thus, the anode exhaust oxidizer is designed to be capable of handling large amounts of unutilized fuel. In certain embodiments, the system may be adapted to use the heat in the plant exhaust of the high efficiency fuel cell system for heating the high pressure natural gas from a gas distribution system in an Energy Recovery Generation System before pressure is let down through a turbine. Use of heat from the fuel cell power plant for heating the high pressure natural gas from a gas distribution system is discussed in U.S. Pat. No. 8,080,344, assigned to the same assignee herein.

In some embodiments, the pressure of the anode exhaust from the topping fuel cell stack(s)/module(s) supplied to the bottoming fuel cell stack(s)/module(s) may be controlled using an anode pressure booster, and the pressure of the cathode exhaust from the bottoming fuel cell stack(s)/module(s) supplied to the topping fuel cell stack(s)/module(s) may be controlled using a cathode pressure booster. In this way, the pressure differential between the anode and cathode streams in the topping module may be controlled using the anode pressure booster and/or the cathode pressure booster. However, in other embodiments, the pressures between the anodes and the cathodes in the topping and bottoming fuel cell stack(s)/module(s) is balanced such that one or more of the anode pressure booster and the cathode pressure booster is eliminated from the system.

The present invention further provides improved thermal uniformity in the fuel cells of the system, particularly in the fuel cells of the bottoming stack(s)/module(s). In some embodiments, the cells in the bottoming stack(s)/module(s) use a different amount and a different distribution of direct internal reforming (DIR) catalyst than the cells in the topping stack(s)/module(s) in order to improve thermal uniformity of the cells in the bottoming stack(s)/module(s). Specifically, the cells in the bottoming stack(s)/module(s) have a gradually increasing direct internal reforming catalyst loading from the anode inlet region to the anode outlet region. In contrast, the cells in the topping stack(s)/module(s) have DIR catalysts distributed uniformly from the anode inlet to the outlet region.

The systems of the present invention and described in more detail below are particularly suited for use with molten carbonate fuel cell stacks. However, these systems may be adapted for use with solid oxide fuel cell stacks and with other types of fuel cells. For example, the system of the present invention may be adapted for use with solid oxide fuel cells and/or with phosphoric acid fuel cells so that the system receives fresh air or dried fresh air as inlet oxidant gas, which is provided to the cathodes of the one or more topping stack(s)/module(s) and/or one or more bottoming stack(s)/module(s) in parallel or in series. During the electrochemical reactions in the fuel cell stacks of the system, most of the carbon dioxide contained in the fuel and in the inlet oxidant gas when the fuel cells are carbonate fuel cells, is output from the anodes of the bottoming stack(s)/module(s) as anode exhaust, which is conveyed to the carbon dioxide capture assembly (gas separation assembly), where carbon dioxide is separated and captured, and the remaining gas stream comprising unused fuel may be mixed with fresh fuel and supplied to the one or more topping fuel cell stack(s)/module(s). In some alternative embodiments, the anode exhaust from the bottoming fuel cell stack(s)/module(s) is oxidized in the anode exhaust oxidizer (AGO) with oxygen and then conveyed to the carbon dioxide capture assembly, where carbon dioxide is separated from the AGO exhaust and stored away or used externally. These systems are suitable for use with solid oxide fuel cells in the topping and bottoming fuel cell stack(s)/module(s) to result in high efficient fuel utilization while also separating and capturing carbon dioxide from the system exhaust. Moreover, these systems may instead utilize phosphoric acid fuel cells, or other types of fuel cells.

FIG. 1 shows an illustrative embodiment of a modular fuel cell system 100 of the present invention. The fuel cell system 100 shown in FIG. 1 has improved performance efficiencies, and in particular, higher fuel utilization and power output compared to conventional fuel cell systems, and also provides manufacturing and operational cost efficiencies compared to conventional fuel cell systems described in the prior art. The system 100 captures carbon dioxide from exhaust generated by the system, reducing the overall carbon-footprint of the system 100. The improved performance, cost efficiencies and carbon capture capability of the fuel cell system 100 are described in more detail herein below.

The fuel cell system 100 of FIG. 1 includes a topping fuel cell assembly and a bottoming fuel cell assembly. In FIG. 1, the topping fuel cell assembly includes first and second topping fuel cell modules 102, 112 while the bottoming fuel cell assembly includes a bottoming fuel cell module 122. The first topping fuel cell module 102 comprises one or more first fuel cell stacks 102A, and each fuel cell stack having two or more cells and having a first topping cathode portion 104 and a first topping anode portion 106. Although in FIG. 1, the first topping fuel cell module 102 is shown as having one fuel cell stack, it is understood that in some embodiments, the first fuel cell topping module 102 includes two or more fuel cell stacks having similar configurations and being disposed within a common containment structure. The fuel cell stacks in the first topping fuel cell module 102 may include high temperature molten carbonate fuel cell stacks. In each cell of each stack 102A, the first topping cathode portion 104 and the first topping anode portion 106 are separated by molten carbonate electrolyte (not shown) stored in an electrolyte matrix.

In FIG. 1, the first topping fuel cell stack 102A is an internally reforming fuel cell stack and includes either direct internal reforming, indirect internal reforming or a combination of both direct and indirect internal reforming. In the present illustrative embodiment, the first topping fuel cell stack 102A includes one or more internal reforming units 148 receiving a portion of the fuel feed and conveying reformed or partially reformed fuel, including hydrogen and carbon monoxide, to a fuel turn manifold 106A, which directs the fuel to the first topping anode portion 106 of the cells of the stack where the fuel undergoes an electrochemical reaction with oxidant gas passing through the first topping cathode portion 104. In the illustrative embodiment of FIG. 1, the first topping cathode portion 104 receives oxidant gas, e.g., flue gas generated by a flue gas generating device, provided to the common containment structure through an open stack face. However, in other embodiments, the oxidant gas may be supplied to the first topping cathode portion 104 through a cathode inlet manifold (not shown).

As shown in FIG. 1, the first topping cathode portion 104 conveys cathode exhaust to a cathode outlet manifold 108. Cathode exhaust is then conveyed from the cathode outlet manifold 108 via suitable ducting to a heat exchanger 136 which can be provided either inside or outside the first topping fuel cell module 102. The first topping anode portion 106 conveys anode exhaust to an anode outlet manifold 110. Anode exhaust is then conveyed from the anode outlet manifold 110 to outside of the first topping fuel cell module 102 for use in the bottoming fuel cell module 122.

As mentioned above, the first topping stack 102A includes one or more internal reforming units 148. Hydrogen, carbon dioxide and carbon monoxide are produced from fuel passing through the one or more internal reforming units 148. Reformed or partially reformed fuel is then supplied to the first topping anode portion 106 of the stack via fuel turn manifold 106A. In the first topping anode portion 106 of the stack, hydrogen electrochemically reacts to produce water, carbon monoxide either reacts electrochemically to form carbon dioxide or chemically with water to produce hydrogen and carbon dioxide. Direct internal reforming (DIR) may also be provided in each cell of the first topping stack 102A by placing reforming catalyst in an anode compartment(s) of the first topping anode portion 106, and in particular, by placing the reforming catalyst in corrugations of an anode current collector of the anode compartment(s) of each cell in the stack.

As discussed above, the first topping fuel cell module 102 may include multiple first topping fuel cell stacks. The number of fuel cell stacks in each fuel cell module is determined based on the number needed to provide the desired power output. The number of fuel cells in each fuel cell stack may be determined by the required output, size and weight of the stacks and ease of transportation.

The topping fuel cell assembly of the fuel cell system 100 also includes the second topping fuel cell module 112, which includes one or more second fuel cell stacks. As with the first topping fuel cell module 102, FIG. 1 shows a single fuel cell stack 112A being included in the second topping fuel cell module 112, but it is contemplated that two or more second topping fuel cell stacks 112A may be included in the same fuel cell module 112 and housed in the same containment structure. The second topping fuel cell stacks in the second topping fuel cell module 112 may comprise high temperature molten carbonate fuel cells.

As shown in FIG. 1, the second topping fuel cell stack 112A includes a second topping cathode portion 114 and a second topping anode portion 116 which in each cell of a stack is separated by an electrolyte matrix storing therein molten carbonate electrolyte (not shown). Fuel entering the second topping anode portion 116 is reformed internally to produce partially or fully reformed fuel including hydrogen and carbon monoxide, which then undergoes an electrochemical reaction with oxidant gas passing through the second topping cathode portion 114. In the second topping anode portion 116 of the stack, hydrogen electrochemically reacts to produce water, and carbon monoxide either reacts electrochemically to form carbon dioxide or chemically with water to produce hydrogen and carbon dioxide. The second topping fuel cell stack 112A includes indirect internal reforming, direct internal reforming or a combination of both direct and indirect internal reforming. In the present illustrative embodiment, the second topping fuel cell stack 112A includes one or more reforming units 150 receiving a portion of the fuel feed and conveying reformed or partially reformed fuel, including hydrogen and carbon monoxide, to a fuel turn manifold 116A, which directs the fuel to the second topping anode portion 116 of the stack where the fuel undergoes the electrochemical reaction with the oxidant gas. In FIG. 1, the second topping cathode portion 114 receives oxidant gas, e.g., flue gas generated by the flue gas generating device, provided to the common containment structure through an open cathode inlet stack face. However, in other embodiments, the oxidant gas may be supplied to the second topping cathode portion 114 through a cathode inlet manifold (not shown).

As shown in FIG. 1, the second topping cathode portion 114 conveys cathode exhaust to a cathode outlet manifold 118. Cathode exhaust is then conveyed from the cathode outlet manifold 118 via suitable ducting to a heat exchanger 138 which can be provided either inside or outside the second topping fuel cell module 112. The second topping anode portion 116 conveys anode exhaust to an anode outlet manifold 120. Anode exhaust is then conveyed from the anode outlet manifold 120 to outside of the second topping fuel cell module 112 for use in the bottoming fuel cell module 122.

As mentioned above, the second topping fuel cell stack 112A includes one or more internal reforming units 150. Hydrogen, carbon dioxide and carbon monoxide are produced from fuel passing through the one or more internal reforming units 150. Reformed or partially reformed fuel is then supplied to the second topping anode portion 116 of the stack via the turn manifold 116A. Direct internal reforming (DIR) may also be provided in the second topping stack 112A by placing reforming catalyst in the anode compartment(s) of the second topping anode portion 116, and in particular, by placing the reforming catalyst in corrugations of an anode current collector of the anode compartment(s) in each cell of the second topping stack 112A.

Similarly as described above with respect to the first topping fuel cell module 102, the second topping fuel cell module 112 may include multiple second topping fuel cell stacks having similar construction. The number of fuel cell stacks per module is determined based on the number needed to provide the desired power output. The number of fuel cells in each fuel cell stack may be determined by the required output, size and weight of the stacks and ease of transportation.

As shown in FIG. 1, the fuel cell system 100 includes the bottoming fuel cell assembly, which, in FIG. 1, comprises the bottoming fuel cell module 122, including one or more fuel cell stacks 122A housed by a common containment structure. Each fuel cell in the bottoming fuel cell stack 122A includes a bottoming cathode portion 124 and a bottoming anode portion 126, which in each cell of a stack are separated by an electrolyte matrix storing therein molten carbonate electrolyte (not shown).

The bottoming fuel cell stack 122A is an internally reforming fuel cell stack and includes direct internal reforming, indirect internal reforming or a combination of both direct and indirect internal reforming. In the embodiment of FIG. 1, the bottoming fuel cell stack 122A includes direct internal reforming catalyst placed in the anode compartment(s) of the bottoming anode portion 126, and in particular, in corrugations of an anode current collector of the anode compartment(s) in each cell of the bottoming fuel cell stack 122A. Although in the embodiment shown in FIG. 1, the bottoming fuel cell stack 122A does not include indirect internal reforming, in other embodiments, the bottoming fuel cell stack may include one or more reforming units for further reforming the anode exhaust received from the first and second topping modules before the reformed anode exhaust is conveyed to the bottoming anode portion 126.

In FIG. 1, the bottoming cathode portion 124 receives oxidant gas, e.g., flue gas generated by a flue gas generating device, provided to the common containment structure through an open cathode inlet stack face. However, in other embodiments, oxidant gas may be supplied to the bottoming cathode portion 124 through a cathode inlet manifold. The bottoming cathode portion 124 conveys cathode exhaust into a cathode outlet manifold 128. As shown in FIG. 1, cathode exhaust collected in the cathode outlet manifold 128 is then conveyed from the bottoming fuel cell module 122 to a flue gas heater 166 via appropriate ducting for pre-heating flue gas input into the system as cathode inlet oxidant gas.

Similarly as described above with respect to the first topping fuel cell modules 102, 112, the bottoming fuel cell module 122 may include multiple bottoming fuel cell stacks, each having a cathode portion and an anode portion. The number of fuel cell stacks per module is determined based on the number needed to provide the desired power output and the efficiency. The fuel cell stacks 122A in the bottoming fuel cell module 122 may include high temperature molten carbonate fuel cells.

The number of fuel cells in each stack, and thus, the height of each stack, in case is controlled by transportability constraints. Standard topping fuel cell stacks in the topping module(s) include about 400 fuel cells, including indirect internal reforming units. However, the bottoming fuel cell stacks in the bottoming module(s) have no reforming units or a significantly smaller number of reforming units than the topping fuel cell stacks. As a result, more space is available to include additional fuel cells in the bottoming fuel cell stacks. For example, if no reforming units are used in the bottoming fuel cell stacks, then there is room for adding on 32 fuel cells to the stack. Thus, in some embodiments, the topping module(s) may include a greater total number of fuel cell stacks than the bottoming module(s), but the number of fuel cells included in each bottoming fuel cell stack may be greater than the number of fuel cells included in each topping fuel cell stack. This stack design helps to maximize power output of the system.

In the present invention and in the embodiment of FIG. 1, the topping and bottoming cathode portions 104, 114, 124 receive flue gas, as cathode inlet oxidant gas, which is generated and output from an external flue gas generating system. The flue gas generating system may be a power plant that produces carbon dioxide as a byproduct of energy and/or heat production, such as a fossil fuel burning power plant, a iron and steel processing plant, a cement manufacturing plant, and/or an ammonia product plant, and, in an embodiment of the present invention, the system 100 may be located at or near the site of such a flue gas generating system. Flue gas output from a flue gas generating system and containing carbon dioxide and oxygen is fed to the system 100 as cathode inlet oxidant gas and is received in the flue gas heater 166 via a flue gas input 168 using a blower 145. The blower 145 increases the pressure of the flue gas and conveys the flue gas to the flue gas heater 166. In some embodiments, air or oxygen is added to the flue gas so as to get a desired amount of oxygen in the oxidant gas and so as to control the CO2 concentration in the oxidant gas supplied to the cathodes. The flue gas heater 166 heats the received flue gas using heat in the cathode exhausts from the topping and/or bottoming fuel cell modules, and thereafter outputs the heated flue gas for use in the topping and/or bottoming fuel cell modules. In the embodiment shown in FIG. 1, the flue gas heater operates as a heat exchanger to use waste heat in the cathode exhaust for heating the flue gas. As shown, after passing through the flue gas heater 166, cooled cathode exhaust is output and exhausted out of the system via an exhaust outlet 192.

In an embodiment of the present invention, the heated flue gas may be conveyed by suitable ducting to the topping and bottoming fuel cell modules in parallel. Alternatively, the heated flue gas may be conveyed to the topping and bottoming fuel cell modules in series, wherein the heated flue gas is first conveyed to one of the topping and bottoming fuel cell modules and thereafter cathode exhaust from the one of the topping and bottoming fuel cell modules is conveyed to the other one of the topping and bottoming fuel cell modules. In the embodiment shown in FIG. 1, the system 100 may be operated with either parallel flow of flue gas between the topping and bottoming fuel cell modules or series flow therebetween, and a programmable controller 152 or similar device may be used to control the flow of the flue gas in accordance with a selected mode of operation as well as the flow rate of the flue gas. Moreover, the controller 152 controls changing from parallel to series operation based on the desired operation and overall CO2 utilization of the topping and bottoming fuel cell modules and the desired operating cell voltage in the topping and bottoming fuel cell modules. For example, series operation or series configuration of the system may be selected over parallel operation or parallel configuration in order to meet CO2 removal targets, system heat conservation, pressure balancing, bottoming module thermal management and fuel cell performance.

In the parallel configuration between the topping fuel cell modules 102, 112 and the bottoming fuel cell module 122, the controller 152 controls to open flow control members or valves 170, 172, 174 and 175 and to close flow control member or valve 176. In such operation, the opening of the valve 175 is controlled by the controller 152 for pressure balancing between the cathodes of the topping fuel cell modules 102, 112 and the cathode of the bottoming fuel cell module 122. Moreover, the controller 152 controls the amount of heated flue gas conveyed to each of the topping and bottoming fuel cell modules, i.e., the distribution of the heated flue gas among the topping and bottoming fuel cell modules, via the flow control members 170, 172, 174 and 175. In the series configuration between the topping fuel cell module(s) 102, 112 and the bottoming fuel cell module 122, where the heated flue gas is first conveyed to the first and second topping fuel cell modules and cathode exhaust from the topping fuel cell modules 102, 112 is thereafter conveyed to the bottoming fuel cell module 122, the controller 152 controls to close valves 174 and 175 and opens valve 176. In such a configuration, heat in the cathode exhaust output from the bottoming fuel cell module may be used for heating the flue gas supplied to the topping fuel cell modules (Heat exchanger not shown in FIG. 1). Using this series flow configuration, the high efficiency fuel cell system can be simplified by eliminating the need for the anode or cathode booster blower and may also allow reasonable CO2 utilization in the topping fuel cell modules, thus enabling the topping fuel cell modules to operate at a higher voltage and higher efficiency.

Another series configuration (not shown) between the bottoming fuel cell module 122 and the topping fuel cell modules 102, 112 may include the heated flue gas being first conveyed to the bottoming fuel cell module and cathode exhaust output from the bottoming fuel cell module being conveyed to the topping fuel cell modules. The system shown in FIG. 1 may be suitably adjusted to provide for such a configuration with suitable ducting between the cathode exhaust of the bottoming fuel cell module 122 and the cathode inlet of the topping fuel cell modules 102, 112 and suitable flow control members which are controlled by the controller 152.

In either parallel or series configurations and operations, the controller 152 controls the flow rate and amount of flue gas supplied to the one or more of the bottoming fuel cell module 122 and the topping fuel cell modules 102, 112. Specifically, the controller 152 controls the flow rate of flue gas so as to support the carbonate fuel cell cathode side electrochemical reaction in each of the topping and bottoming fuel cell modules 102, 112, 122 and so as to achieve a predetermined overall CO2 utilization in the topping and bottoming fuel cell modules 102, 112, 122, preferably as high as 85%. In the illustrative configuration of FIG. 1, which includes two topping fuel cell modules 102, 112 and one bottoming fuel cell module 122, cathode gas flow to the fuel cell stacks is also controlled so that the CO2 to oxygen utilization ratio is controlled to be 2:1 or greater in order to support the carbonate fuel cell cathode side electrochemical reaction.

In the present invention, supplemental air (fresh air) may be added (not shown) to the inlet oxidant gas supplied to topping modules and/or to the bottoming modules in order to control the concentration of carbon dioxide or oxygen and temperature of the inlet oxidant gas. The addition of the supplemental air and the flow rate of the supplemental air is adjusted and modulated by the controller 152 (supplemental air supply, i.e., a blower and control devices, i.e., flow control valves not shown) in order to control and maintain a desired thermal profile within each of the modules. For example, supplemental air may be added to dilute flue gas supplied to the topping and/or bottoming fuel cell modules so as to lower the temperature of the cathode inlet gas and to control the concentration of carbon dioxide or oxygen in the cathode inlet gas. If the cathode inlet temperature in the topping modules and/or the bottoming modules is higher than the desired value, the controller 152 will increase the supplemental air supply to topping modules and/or the bottoming modules, respectively, to reduce the cathode inlet temperature. If the concentration of carbon dioxide is too high or if the oxygen concentration is too low in the topping modules and/or the bottoming modules, the controller 152 will increase the supplemental air supply to topping modules and/or the bottoming modules to reduce the carbon dioxide concentration or increase the oxygen concentration.

As shown in FIG. 1, the bottoming anode portion 126 of the bottoming fuel cell module 122 is operably coupled to each of the first topping anode portion 106 and the second topping anode portion 116 such that the bottoming anode portion 126 receives anode exhaust conveyed from both the first and the second topping anode portions 106 and 116 of the first and second topping fuel cell modules 102, 112. In the illustrative embodiment of FIG. 1, the first topping anode portion 106 and the second topping anode portion 116 are configured in a two-to-one ratio with the bottoming anode portion 126, and the total number of fuel cell stacks of the first and second topping fuel cell modules 102, 112 are configured in a two-to-one ratio with the number of fuel cell stacks of the bottoming fuel cell module 122. In other embodiments, the number of topping modules and bottoming modules may vary, and the total number of topping fuel cell stacks and bottoming fuel cell stacks may also vary. For increased efficiency, in certain embodiments, the number of topping modules is greater than the number of bottoming modules, and/or the total number of topping fuel cell stacks is greater than the total number of bottoming fuel cell stacks. The topping modules or stacks have higher current density (because of better fuel quality) and fuel utilization than the bottoming modules or stacks.

As shown, anode exhaust output from the anode portions of the topping fuel cell modules 102, 112 and comprising unutilized fuel is conveyed for use in the bottoming fuel cell module 122. Specifically, in FIG. 1, anode exhaust received from the topping fuel cell module(s) in the bottoming fuel cell module 122 is supplied to a fuel turn manifold 126A of each stack of the bottoming fuel cell module 122 for use as anode side input gas. The fuel turn manifold 126A directs the anode side input gas to the bottoming anode portion 126 of the stack where the unutilized fuel in the anode side input gas undergoes the electrochemical reaction with the oxidant gas (e.g., heated flue gas) supplied to the bottoming cathode portion 124. In some embodiments, supplemental fuel 151 may also be provided to the bottoming anode portion 126, such as by adding supplemental fuel to the anode exhaust from the topping fuel cell modules when it is conveyed to the bottoming fuel cell module. The amount of supplemental fuel 151 provided to the bottoming anode portion 126 is controlled by the controller 152 so as to achieve a desired fuel utilization and current generation in the bottoming fuel cell module.

Anode exhaust generated in the bottoming anode portion 126 is output from the bottoming fuel cell module via an anode outlet manifold 130 and is then conveyed to a separation assembly 177 for separating CO2 from the anode exhaust of the bottoming fuel cell module 122. The anode exhaust from the bottoming anode portion 126 includes all of the CO2 from the anode side input gas provided to the topping anode portions 106 and 116 and provided to the bottoming anode portion 126 and all of the CO2 extracted from the cathode oxidant gas streams of the topping and bottoming fuel cell modules. The amount of CO2 present in the anode exhaust output from the bottoming anode portion 126 may be as high as 90% of the total CO2 fed to the system 100. For example, anode exhaust output from the bottoming anode portion may contain about 53% carbon dioxide, 42% water vapor, and a mixture of about 5% of hydrogen and carbon monoxide, e.g., syngas. The separation assembly 177 separates the different components of the anode exhaust and in the illustrative configuration of FIG. 1, comprises a condenser 178 and a CO2 capture assembly 180.

The condenser 178 cools and condenses the anode exhaust from the bottoming fuel cell module 122 so as to separate water therefrom. The condenser 178 outputs dry anode exhaust (water separated anode exhaust) to the CO2 capture assembly 180. For example, the dry anode exhaust will contain about 90% carbon dioxide and 9% water vapor, as well as additional inert gases. The CO2 capture assembly 180 removes carbon dioxide from the dry anode exhaust so that the resulting dry separated anode exhaust has a substantially reduced amount of carbon dioxide and has a composition similar to that of the reformed fuel input to the first and second topping anode portions 106, 116. The CO2 capture assembly 180 removes the carbon dioxide from the dry anode exhaust using one or more separation processes such as compression and cooling to cryogenic carbon dioxide, solvent washing, or a membrane process. The dry separated anode exhaust is conveyed from the CO2 capture assembly 180 as a recycled stream to an anode pressure booster 182, which increases the pressure of the recycled stream before it is conveyed via a control valve 188 to be mixed with the fresh fuel input into the system 100 from a fuel supply 186. In some embodiments, some or all of the recycled stream may instead be conveyed via a bypass valve 190 to be mixed with partially reformed fuel output from the pre converter 134. The controller 152 may adjust the valves 188 and 190 so as to adjust the amount of the recycled stream added to the fresh fuel and the amount of the recycled stream added to the partially reformed fuel. In these embodiments, with the recycled fuel stream, the system 100 can achieve a very high fuel utilization and efficiency.

In the embodiment of FIG. 1, a valve 184 or a similar device may be provided in the ducting between the CO2 capture assembly 180 and the anode pressure booster 182. The controller 152 may adjust valve 184 to bleed off a portion of the recycled stream so that a portion of the inert gases, such as nitrogen, is vented off from the recycled stream to prevent accumulation of these inert gases.

Operation of the system shown in FIG. 1 will now be described. During operation, flue gas generated and output from the flue gas generating system is supplied to the system 100 via the flue gas input 168. The flue gas is heated using waste heat from cathode exhaust output from the topping and bottoming fuel cell modules in the flue gas heater 166. The heated flue gas is then provided to the topping and bottoming fuel cell modules 102, 112, 122 either in parallel or in series for use as cathode oxidant gas. As described herein below, during operation of the system 100, carbon dioxide in the flue gas used as cathode oxidant gas is extracted in the topping and bottoming fuel cell modules and output with anode exhaust from the bottoming fuel cell module so that the carbon dioxide can be separated and captured.

Also during operation of the system of FIG. 1, the first and second topping fuel cell modules 102, 112 each receive a portion of the fuel feed, such as methane, natural gas, or other suitable fuel, from the fuel supply 186. Prior to being conveyed to the topping fuel cell modules 102, 112, the fuel feed may be preheated and/or processed. For example, a humidifier may be used to humidify the fuel feed and the preconverter 134 may be used to partially reform some of the fuel feed externally of the topping fuel cell modules. Moreover, the fuel feed may be deoxidized in a deoxidizer, desulfurized in a desulfurizer (not shown) and/or undergo other processing as may be required to meet fuel cell specifications for purity. Preheated and/or processed fuel feed is then divided between the first and second topping fuel cell modules 102, 112, with the first topping fuel cell module 102 receiving a first portion of the fuel feed and the second topping fuel cell module 112 receiving a second portion of the fuel feed, and the first and second portions of the fuel feed may be controlled to be about the same or to be different in amount. The controller 152 may be used to control the respective amounts of the first and second fuel feed portions supplied to the first and second topping fuel cell modules 102, 112. The fuel feed portions received in each of the first and second topping fuel cell modules 102, 112 are then pre-heated using cathode exhaust heat conveyed from the respective topping fuel cell module in first and second heat exchangers 136, 138 (fuel superheaters), respectively. The fuel superheaters 136 and 138 in the examples are located within the stack modules and are separate units. In some embodiments the heat exchangers 136, 138 are located outside the module enclosure and can be combined into one heat exchanger. In each of the first and second fuel cell modules 102, 112, the pre-heated fuel feed portion is then conveyed to the topping anode portion 106, 116 of the one or more fuel cell stacks of the respective topping module and may be reformed in an indirect internal reformer 148, 150 before being conveyed to the respective topping anode portion 106, 116.

The first and second topping fuel cell modules 102, 112 consume a portion of the fuel contained in the respective fuel feed portions conveyed to the topping fuel cell module, so that the anode exhaust conveyed from the first and second topping modules 102, 112 contains the remaining fuel portion therein. The first and second fuel cell modules 102, 112 consume about two-thirds of the fuel in the fuel feed, and convey anode exhaust containing the remaining portion of fuel, which is about one third of the initial fuel in the fuel feed. During the electrochemical reaction in the first and second fuel cell modules 102, 112, CO2 present in the cathode oxidant stream (flue gas) being conveyed through the respective topping cathode portions 104, 114 is extracted and conveyed across the electrolyte matrix to the respective topping anode portions. As a result, anode exhaust output from the anode topping portions includes not only the remaining unutilized fuel but also CO2 extracted from the cathode oxidant stream of the topping cathode portions 104, 114.

In FIG. 1, the fuel cell system 100 may include an anode booster blower 132 which is disposed downstream from the first and second topping fuel cell modules 102, 112 and upstream of the bottoming fuel cell module 122. The anode booster blower 132 receives anode exhaust conveyed from the first and second topping anode portions 106, 116 and increases the pressure of the anode exhaust before it is conveyed to the bottoming fuel cell module 122. The anode booster blower 132 operates with a low pressure increase, resulting in low compression power and low cost. The anode booster blower 132 operation may be controlled by the controller 152 so as to control the differential pressure between the anode and cathode portions of the first and second topping fuel cell modules and the bottoming fuel cell module 102, 112, and 122, respectively. In this system, the anode to cathode differential pressure of both the topping and the bottoming fuel cell modules, 102, 112 and 122 can be affected by the booster blower 132. When the differential pressure between the anode and cathode portions of the topping fuel cell module(s) and the bottoming fuel cell module is balanced by the controller 152, the anode booster blower 132 may be removed from the system 100.

As shown in FIG. 1, anode exhaust supplied to the bottoming fuel cell module 122 by the anode booster blower 132 may be supplemented with fresh supplemental fuel 151.

The supplemental fresh fuel may be mixed with the anode exhaust without requiring any additional water to humidify the fuel since the anode exhaust stream from the first and second topping fuel cell modules 102, 112 includes adequate amounts of water. The amount of fresh fuel supplied to the bottoming fuel cell module may be controlled by the controller 152 so as to achieve a desired fuel utilization and current generation in the bottoming fuel cell module. The supplemental fresh fuel may be supplied from the same fuel supply as the topping fuel cell modules, or may be supplied from a different fuel supply. In some embodiments, the supplemental fresh fuel comprises a reformable fuel such as methane.

As mentioned herein above, in some embodiments, the bottoming fuel cell stacks of the bottoming fuel cell module include indirect internal reformers. In such embodiments, the supplemental fuel is provided to the indirect internal reformers of the bottoming fuel cell stack, and the reformed or partially reformed supplemental fuel is then fed from the indirect internal reformers to the bottoming anode portions of the bottoming stack. In some embodiments, only the supplemental fuel is fed to the indirect internal reformers of the bottoming fuel cell stack, while the anode exhaust from the first and second topping fuel cell modules 102, 112 is provided directly into the fuel turn manifold 126A of the bottoming stack, without being conveyed through the indirect internal reformers. This configuration improves the thermal profile of the bottoming stacks and maximizes the power output from the bottoming stacks.

Anode inlet gas comprising anode exhaust from the topping fuel cell modules and optionally supplemental fresh fuel is received in the bottoming fuel cell module 122 and is conveyed to the bottoming anode portion 126 of the fuel cell stack(s) in the bottoming fuel cell module via the fuel turn manifold 126A. As discussed above, the anode inlet gas may be reformed through direct internal reforming in the bottoming anode portion. During the electrochemical reaction in the bottoming fuel cell module, fuel in the anode inlet gas reacts with cathode oxidant gas (portion of flue gas) conveyed through the bottoming cathode portion, and CO2 present in the cathode oxidant gas is extracted and conveyed through the electrolyte matrix to the bottoming anode portion. As a result, anode exhaust produced by and output from the bottoming anode portion will include CO2 that was already present in the anode inlet gas as well as CO2 extracted from the cathode oxidant gas. That is, the anode exhaust output from the bottoming anode portion 126 will include the CO2 initially present in the fuel feed, the CO2 extracted from the cathode oxidant gas conveyed through the topping cathode portions 104, 114 and present in the anode inlet gas input into the bottoming anode portion 126, and the CO2 extracted from the cathode oxidant gas conveyed through the bottoming cathode portion 124. The anode exhaust from the bottoming anode portion 126 further includes water and unutilized fuel.

As discussed above, anode exhaust produced by the bottoming anode portion is conveyed via the anode outlet manifold 130 from the bottoming fuel cell stack(s) and is output from the bottoming fuel cell module 122 to the separation assembly 177. In the separation assembly 177 of FIG. 1, the anode exhaust is conveyed to the condenser 178 which removes water from the anode exhaust and conveys dry anode exhaust to the carbon capture assembly 180. The carbon capture assembly 180 separates and removes most of the carbon dioxide from the dry anode exhaust and recycles the dry separated anode exhaust having a reduced amount of carbon dioxide for use in the topping fuel cell modules 102, 112 via the anode pressure booster 182. In addition, a small portion of the dry separated anode exhaust is bled off via the valve 184 so as to prevent accumulation of inert gases before the dry separated anode exhaust is provided to the anode pressure booster 182. The anode pressure booster 182 increases the pressure of the recycled dry separated anode exhaust stream and conveys it to be mixed with the fresh fuel supplied by the fuel supply 186. Alternatively, the recycled dry separated anode exhaust stream is bypassed around the preconverter 134 to be mixed with partially reformed fuel output from the preconverter. In these embodiments, with the recycled fuel stream, system 100 can achieve a very high fuel utilization and efficiency.

As discussed above, the fuel cell system 100 includes the controller 152 programmed to control various components and operations of the fuel cell system 100. The controller 152 is programmed to control one or more of:

(1) the amount and flow rate of supplemental air (fresh air) supplied to the first and second topping fuel cell modules 102, 112 and/or to the bottoming fuel cell module 122 so as to dilute the flue gas/cathode oxidant gas with the fresh air and to control the temperature and concentration of carbon dioxide and oxygen in the inlet oxidant gas conveyed to the topping and bottoming fuel cell modules;

(2) the operation of the anode booster blower 132 so as to control the differential pressure between the anode and cathode portions of the first and second topping fuel cell modules 102, 112, and the bottoming module 122 and to maintain a low differential pressure;

(3) the amount and flow rate of supplemental fuel supplied to the bottoming fuel cell module so as to achieve a desired fuel utilization and current generation in the bottoming fuel cell module;

(4) the flow of the flue gas to be conveyed to the topping fuel cell assembly and to the bottoming fuel cell assembly in parallel or in series;

(5) the flow rate of flue gas provided to the one or more topping fuel cell assembly and bottoming fuel cell assembly so as to achieve a predetermined overall CO2 utilization, preferably 50% or greater, and in some embodiments, 85% or greater, and so as to support a fuel cell cathode side electrochemical reaction in each of the topping and bottoming fuel cell assemblies;

(6) the pressure between the anode and cathode sides of the topping fuel cell module and of the bottoming fuel cell module such that the pressure is balanced;

(7) the amount of fuel feed provided to each of the first and second topping fuel cell modules;

(8) gradually withdrawing supplemental fuel from bottom stacks and deliver the fuel to the topping stacks and shifting of output from the topping modules to the bottoming module as the stacks age;

(9) the amount of recycled dry separated anode exhaust mixed with fresh fuel and the amount of recycled dry separated anode exhaust bypassing the preconverter.

Controlling of one or more of the above operations by the controller depends on the actual operating conditions and desired operation of the system, the length of operation, and other factors. For example, current generated by the bottoming fuel module 122 is controlled based on electricity needs, e.g., customer need for electricity, so that when electricity need is low, the controller 152 controls so that a smaller amount of or no supplemental fuel is supplied to the bottoming fuel cell module, and when electricity needs increase, the controller 152 controls so that the amount of supplemental fuel supplied to the bottoming fuel cell module is increased.

Moreover, in the present invention, as the reforming rates of the first topping fuel cell module 102 and the second topping fuel cell module 112 decrease with age of the system, the controller 152 controls so that supplemental fuel, which is methane rich fuel, conveyed to the bottoming module 122 is gradually diverted to the first and second topping modules 102, 112. That is, as the system continues to operate and the reforming rates in the topping modules 102, 112 decrease, less supplemental fuel is sent to the bottoming module 122 and more fuel is sent to the first and second topping modules 102, 112. In this way, the loss of methane cooling load of the topping modules is compensated by the addition of more fuel including methane. As a result, current generated in the topping modules is reduced with operating time and current generated in the bottoming fuel cell module(s) is increased with operating time based on the amount of unreformed fuel supplied to the bottoming fuel cell module(s) from the topping fuel cell module(s). Moreover, such control does not affect the cooling of the bottoming module 122 since the bottoming module receives unconverted fuel, including unconverted methane, from the topping modules that have reduced reforming rates.

According to the system and operation of the system described above, fuel is first fed to two parallel topping fuel cell modules 102, 112, which electrochemically consume about 65% to 75% of the fuel depending on operating conditions. Fuel exhaust from the topping fuel cell modules 102, 112 is then supplied to the bottoming fuel cell module 122, which may also receive additional fresh fuel (supplemental fuel). The bottoming fuel cell module 122 consumes about 60-70% of the fuel it receives in an electrochemical conversion reaction. Thus, the topping fuel cell assembly and the bottoming fuel cell assembly utilize between about 80% and 100% of the fuel provided to the system 100 and the system 100 achieves electrical conversion efficiency higher than 60%.

The controller 152 can be a conventional PLC (programmable logic controller) made by GE. The control program used, in turn, can be a software product called "Versapro," a GE product implementable in GE PLCs for industrial automation. In other embodiments, the controller can be a conventional DCS (distributed control system) manufactured by Foxboro, and the control program can be software implemented in the DCS for industrial automation, also manufactured by Foxboro. In yet another embodiment, the controller can be a conventional PLC-based "Iconics" system. Although the controller 152 has been described as controlling the various components noted above, it is understood that the controller 152 may control any of the components disclosed herein, whether or not specifically stated.

The present invention also contemplates controlling thermal conditions in the fuel cell stacks of the topping and bottoming modules of the system shown in FIG. 1. As discussed above, the fuel cell stacks of the topping and bottoming modules include internal reforming and in particular, direct internal reforming wherein reforming catalyst is distributed within the anode compartments of the stacks. In order to improve thermal uniformity of the fuel cells, particularly in the stack(s) of the bottoming module, the fuel cells in the bottoming module use a different amount and spatial distribution of the direct internal reforming catalyst than the fuel cells in the topping modules.

In another embodiment, high efficiency fuel cell system 100 of FIG. 1 is adapted for use with fresh air or dried fresh air as inlet oxidant gas to the topping and/or bottoming fuel cell cathode portions instead of the flue gas from a flue gas generating device. In this mode of operation, the exhaust from the anodes of the bottoming fuel cells is conveyed to a gas separation assembly where carbon dioxide and water are separated from the unutilized fuel in the anode exhaust similarly to the system shown in FIG. 1. Separated carbon dioxide can be sequestered or used for other applications. The separated unutilized fuel, with reduced carbon dioxide and water can be pressurized and combined with the fuel feed to the topping module. The fuel cells in this system can be a solid oxide fuel cell, or any other fuel cells, including phosphoric acid fuel cells.

In yet another embodiment, the topping and/or bottoming cathode portions may selectively receive either the flue gas from the flue gas generating device, either alone or mixed with supplemental air, or the fresh air or dried fresh air, as inlet oxidant gas, depending on the mode of operation of the system. In such embodiments, suitable ducting and flow control members or valves are provided for such selective supply of flue gas or air to the topping and/or bottoming cathodes, and the controller 152 controls the type of inlet oxidant gas (i.e., flue gas or air) supplied to the cathode portions by controlling the opening and closing of the flow control members or valves.

Figure 2:
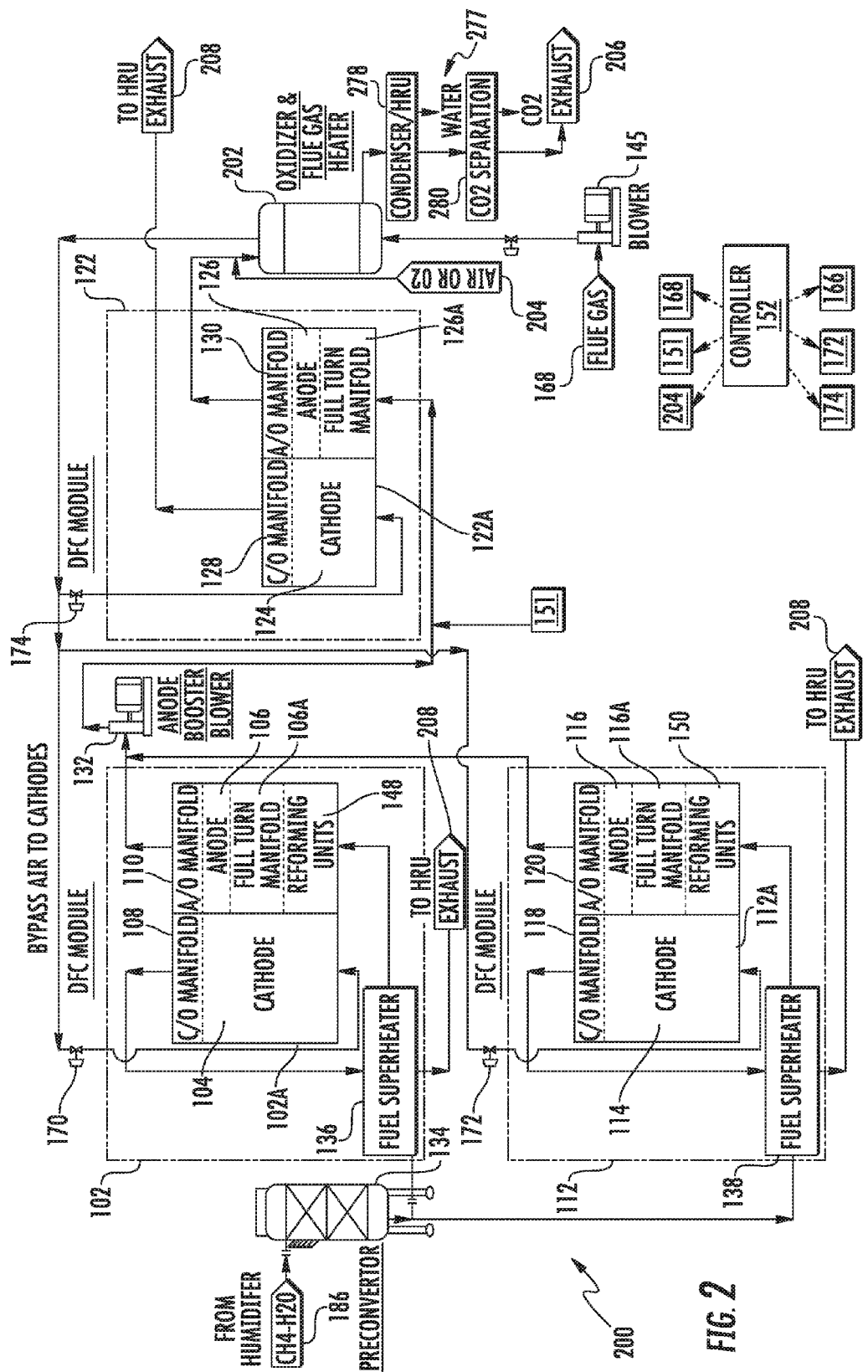
FIG. 2 shows an alternative embodiment of the high efficiency fuel cell system of FIG. 1.

FIG. 2 shows an alternative embodiment of the high efficiency fuel cell system 200 of FIG. 1. The embodiment of the present invention illustrated by FIG. 2 is configured similarly as described above with the exception of the cathode exhaust and the anode exhaust conveyed from the bottoming fuel cell module 122. In FIG. 2, like components of the system 200 are labeled with like reference numbers from system 100 in FIG. 1 and a detailed description thereof is omitted. In the illustrative embodiment shown in FIG. 2, the flue gas from the flue gas generating device is conveyed to the topping and bottoming fuel cell modules in parallel, and cathode exhaust output by each of the topping and bottoming fuel cell modules is conveyed to a heat recovery unit (not shown) for recovering and using waste heat in the cathode exhaust and thereafter outputting the exhaust 208 from the system 200. The cathode exhaust may be first output from the system 200 and thereafter provided to an external heat recovery unit for recovering waste heat. It is understood that the system of FIG. 2 may be modified so that the flue gas from the flue gas generating device is conveyed to the topping and bottoming fuel cell modules in series, so that the flue gas is first conveyed to one of the topping fuel cell modules and the bottoming fuel cell modules, and cathode exhaust generated by the one of the topping fuel cell modules and the bottoming fuel cell modules is then conveyed to the other of the topping fuel cell modules and the bottoming fuel cell modules. For example, like in the configuration of FIG. 1, the system 200 may be configured so that the topping fuel cell modules first receive the flue gas generated by the flue gas generating device and cathode exhaust from the topping fuel cell modules is then conveyed for use as oxidant gas in the bottoming fuel cell module. It is also contemplated that the system 200 may be configured to convey the flue gas to the topping and bottoming fuel cell modules in series and in parallel and a controller 152 is provided for controlling the operation mode of the system 200 so that the system is operated in either a parallel mode with the parallel flow of the flue gas or in a series mode with the series flow of the flue gas.

In the embodiment of FIG. 2, the flue gas heater is replaced with a combined oxidizer and flue gas heater 202 which catalytically oxidizes anode exhaust output from the bottoming fuel cell module 122 with air or oxygen to generate combustion gas having a high CO2 content and waste heat. When oxygen is used for oxidizing the anode exhaust, the combustion gas comprises substantially all CO2 and water. The waste heat generated by the combined oxidizer and flue gas heater 202 is used for heating the flue gas generated by the flue gas generating device and input into the system 200 via the flue gas inlet 168. The controller 152 controls the amount of air/oxygen supplied to the combined oxidizer and flue gas heater 202 so as to control the temperature in the oxidizer and flue gas heater 202.

Combustion gas output from the combined oxidizer and flue gas heater 202 is conveyed to a separation assembly 277, which in the embodiment of FIG. 2 comprises a condenser/heat recovery unit (HRU) 278 and a CO2 separator 280. The condenser/HRU 178 cools the combustion gas to condense out the water and outputs water separated or dry combustion gas to the CO2 separator 280, which separates CO2 from the dry combustion gas for storage or for another use and outputs the remaining combustion gas to be exhausted out of the system. The CO2 separator 280 in the embodiment of FIG. 2 may have the same or similar configuration as the CO2 separator 180 of FIG. 1 and may use the same or similar techniques for separating the CO2.

The embodiment of the present invention illustrated by FIG. 2 operates similarly as described above with respect to FIG. 1, with the exception of the cathode exhaust and the anode exhaust conveyed from the bottoming fuel cell module 122. In the embodiment of FIG. 2, the bottoming anode portion 126 conveys anode exhaust to the combined oxidizer and flue gas heater 202, where the anode exhaust is oxidized with air or oxygen to generate combustion gas and waste heat for heating the input flue gas. The combustion gas is conveyed from the oxidizer and flue gas heater 202 to the condenser 278 of the separation assembly 277. The condenser 278 condenses out the water from the combustion gas received from the combined oxidizer and flue gas heater 202 and conveys the dry combustion gas to the CO2 capture assembly 280. The CO2 capture assembly 280 processes the dry combustion gas to separate carbon dioxide from the remaining exhaust and outputs the separated carbon dioxide for storage or other uses and separately outputs the remaining combustion gas to be exhausted out of the system. As a result of the configuration and operation of the system 200, for the same reasons as described above with respect to FIG. 1, more than 90% of the carbon dioxide input into the system 200 via the flue gas and the fuel can removed and separated by the system 200 of the present invention.

The systems shown in FIGS. 1 and 2 are illustrative examples of the system of the present invention which use one or more topping stack(s), which may be in the form of module(s) and one or more bottoming stack(s), which may be in the form of module(s), and wherein anode exhaust from the topping stack(s) is conveyed to the bottoming stack(s) and cathode exhaust from the topping stack(s) can be conveyed to the bottoming stack(s), and wherein the topping stack(s) and bottoming stack(s) are configured to generate ~$\frac{2}{3}$ of the system currents in the topping stacks and ~$\frac{1}{3}$ of the system current in the bottoming stack(s), to improve fuel utilization, fuel efficiency, thermal uniformity within the system and lower cost of electricity. In addition, the systems of FIGS. 1 and 2 use flue gas supplied from an external flue gas generating device as cathode oxidant gas and CO2 in the flue gas is extracted and output in the anode exhaust output from the bottoming fuel cell module so that the CO2 can be captured and stored away or easily provided for other uses. Thus, the systems of FIGS. 1 and 2 are capable of not only generating electricity with increased efficiency and lowered overall emissions, but also of capturing and separating CO2 output from flue gas generating devices, thus accomplishing substantially lower overall CO2 emissions.

In another embodiment, the high efficiency fuel cell system of FIG. 2 may be adapted for use with fresh air or dried fresh air as inlet oxidant gas to the topping and/or bottoming fuel cell cathode portions instead of the flue gas from a flue gas generating device. In such embodiment, the exhaust form the anodes of the bottoming fuel cells is conveyed to a combined oxidizer and air heater, having a similar configuration to that of the combined oxidizer and flue gas heater 202 of FIG. 2. In the combined oxidizer and air heater, the anode exhaust is oxidized with air or oxygen to generate combustion gas and waste heat for heating the inlet oxidant gas (fresh air or dried fresh air). The combustion gas is then conveyed to the separation assembly, which has a similar configuration as the condenser in FIG. 2 and includes a condenser for condensing out the water from the combustion gas and a CO2 capture assembly for processing the dry combustion gas to separate carbon dioxide for storage or other uses. The remaining CO2-depleted combustion gas is output from the separation assembly to be exhausted out of the system. As in the system of FIG. 2, most of the carbon dioxide input into the system via the inlet oxidant gas (air/dried air) and flue can be removed and separated, while also maintaining high fuel utilization in the topping and bottoming fuel cells.

In all cases it is understood that the above-described arrangements are merely illustrative of the many possible specific embodiments which represent applications of the present invention. For example, although in the specific configurations of FIGS. 1 and 2, the number of topping fuel cell modules and the total number of topping fuel cell stacks is greater than the number of bottoming fuel cell module(s) and/or the total number of bottoming fuel cell stack(s), it is understood that in other configurations, the number of topping fuel cell module(s) may be the same as the number of bottoming fuel cell module(s), and/or the total number of topping fuel cell stack(s) may be the same as the total number of bottoming fuel cell stack(s). In such other configurations, the topping fuel cell module(s) and the topping fuel cell stack(s) may have a greater total number of fuel cells than the bottoming fuel cell module(s) and the bottoming fuel cell stack(s). Numerous and varied other arrangements can be readily devised in accordance with the principles of the present invention without departing from the spirit and the scope of the invention.

What is claimed is:

1. A high efficiency fuel cell system adapted to receive flue gas from a flue gas generating device and to capture carbon dioxide from the flue gas, the high efficiency fuel cell system comprising:
   a topping fuel cell assembly comprising two or more topping fuel cell modules, each topping fuel cell module comprising a topping cathode portion and a topping anode portion;
   a bottoming fuel cell assembly comprising a bottoming cathode portion and a bottoming anode portion, wherein the bottoming anode portion receives anode exhaust output from the topping anode portion; and
   a separation assembly configured to receive carbon dioxide-containing exhaust and to separate carbon dioxide from the carbon dioxide-containing exhaust,
   wherein the carbon dioxide-containing exhaust is one of anode exhaust output from the bottoming anode portion and a gas derived from the anode exhaust output from the bottoming anode portion, wherein at least one of the topping cathode portion and the bottoming cathode portion receives at least a portion of the flue gas output from the flue gas generating device, wherein the topping fuel cell assembly has a greater number of fuel cells than the bottoming fuel cell assembly so that the topping fuel cell assembly utilizes more fuel than the bottoming fuel cell assembly, and wherein the system is configured such that anode exhaust from each of the topping anode portions of the topping fuel cell modules is combined after exiting the respective topping anode portions, and the combined anode exhaust is received by the bottoming anode portion.

2. The high efficiency fuel cell system in accordance with claim 1, wherein the topping cathode portion and the bottoming cathode portion each receive a portion of the flue gas output from the flue gas generating device in parallel.

3. The high efficiency fuel cell system in accordance with claim 1, wherein one of the topping cathode portion and the bottoming cathode portion receives at least a portion of the flue gas output from the flue gas generating device and generates cathode exhaust, and the other one of the topping cathode portion and the bottoming cathode portion receives the cathode exhaust generated by the one of the topping cathode portion and the bottoming cathode portion.

4. The high efficiency fuel cell system in accordance with claim 3, wherein the topping cathode portion receives at least a portion of the flue gas output from the flue gas generating device and generates cathode exhaust, and the bottoming cathode portion receives the cathode exhaust generated by the topping cathode portion.

5. The high efficiency fuel cell system in accordance with claim 1, wherein the topping cathode portion and the bottoming cathode portion are adapted to receive the flue gas in parallel or in series, and wherein the system further comprises a controller for controlling the flow of the flue gas to the topping cathode portion and the bottoming cathode portion to be in parallel or in series.

6. The high efficiency fuel cell system in accordance with claim 1, wherein:
the carbon dioxide-containing exhaust is anode exhaust output from the bottoming anode portion,
the separation assembly outputs separated carbon dioxide and separately outputs separated anode exhaust with a reduced amount of carbon dioxide, and
the separated anode exhaust is recycled to the topping anode portion for use as fuel.

7. The high efficiency fuel cell system in accordance with claim 6, further comprising a conduit and a flow control member for bleeding off a small amount of the separated anode exhaust to remove inert gases prior to recycling the remaining separated anode exhaust to the topping anode portion.

8. The high efficiency fuel cell system in accordance with claim 1, wherein:
the system further comprises an oxidizer assembly for oxidizing anode exhaust output from the bottoming anode portion with one or more of air and oxygen to generate the carbon dioxide-containing exhaust and to generate waste heat for heating the flue gas before the flue gas is provided to the at least one of the topping and bottoming cathode portions, and
the separation assembly outputs separated carbon dioxide and separately outputs a separated gas with a reduced amount of carbon dioxide.

9. The high efficiency fuel cell system in accordance with claim 1, wherein the separation assembly comprises:

a condenser for cooling the carbon dioxide-containing exhaust to separate water from the carbon dioxide-containing exhaust and to output a water separated carbon dioxide containing exhaust, and a carbon dioxide separator for separating carbon dioxide from the water separated carbon dioxide-containing exhaust to output a separated gas with a reduced carbon dioxide content and to separately output carbon dioxide suitable for one or more of storage and external use.

10. The high efficiency fuel cell system in accordance with claim 9, wherein the carbon dioxide separator separates the carbon dioxide using one or more of compression and cryogenic cooling to generate liquid carbon dioxide, solvent washing, and a membrane process.

11. The high efficiency fuel cell system in accordance with claim 1, further comprising a controller for controlling the flow rate of the flue gas to the one or more of the topping cathode portion and bottoming cathode portion to support a fuel cell cathode side electrochemical reaction in each of the topping and bottoming fuel cell assemblies and to achieve an overall CO2 utilization of 50% or greater.

12. The high efficiency fuel cell system in accordance with claim 1, further comprising a controller for controlling the flow rates of flue gas and fuel through the topping fuel cell assembly and bottoming fuel cell assembly so that pressures between the topping anode portion and the topping cathode portion are balanced and the pressures between the bottoming anode portion and the bottoming cathode portion are balanced.

13. The high efficiency fuel cell system in accordance with claim 1, wherein overall fuel utilization by the high efficiency fuel cell system is 80% or greater.

14. The high efficiency fuel cell system in accordance with claim 1, wherein the bottoming anode portion further receives supplemental fuel, and
the high efficiency fuel cell system further comprises a controller for controlling the amount of supplemental fuel conveyed to the bottoming anode portion,
wherein the controller controls the amount of current generated in the bottoming fuel cell assembly by controlling the amount of supplemental fuel conveyed to the bottoming anode portion.

15. The high efficiency fuel cell system in accordance with claim 1, further comprising a controller, wherein the controller controls one or more of:
(a) the amount of current generated in the topping and bottoming fuel cell assemblies so that as operating time of the high efficiency fuel cell system increases, the amount of current generated by the topping fuel cell assemblies decreases and the amount of current generated by the bottoming fuel cell assemblies increases;
(b) the amount of current generated in the bottoming fuel cell assembly based on electricity needs so that the amount of current generated in the bottoming fuel cell assembly is increased when the electricity need increases;
(c) the flow of the flue gas to be conveyed to the topping fuel cell assembly and to the bottoming fuel cell assembly in parallel or in series;
(d) the flow rate of flue gas to the topping fuel cell assembly and to the bottoming fuel cell assembly to achieve a predetermined overall CO2 utilization;
(e) the pressure between the anode and cathode portions in the topping fuel cell modules and the bottoming fuel cell module such that the pressure is balanced;
(f) the amount of fuel feed provided to each of the first and second topping fuel cell modules;

(g) the amount of supplemental fuel provided to the bottoming fuel cell assembly;

(h) recycling of a remaining exhaust with a reduced carbon dioxide concentration output from the separation assembly to the topping anode portion; and (i) the amount of supplemental air supplied to one or more of the topping cathode portion and the bottoming cathode portion so as to control the temperature and concentration of carbon dioxide and oxygen in a cathode inlet gas conveyed to the one or more of the topping cathode portion and the bottoming cathode portion.

16. A method of generating electricity using a high efficiency fuel cell system adapted to receive flue gas from a flue gas generating device and of capturing carbon dioxide from the flue gas, the method comprising:
providing a high efficiency fuel cell system including:
a topping fuel cell assembly comprising two or more topping fuel cell modules, each topping fuel cell module comprising a topping cathode portion and a topping anode portion, and
a bottoming fuel cell assembly comprising a bottoming cathode portion and a bottoming anode portion;
providing at least a portion of the flue gas output from the flue gas generating device to at least one of the topping cathode portion and the bottoming cathode portion;
receiving anode exhaust output in the bottoming anode portion from the topping anode portion;
conveying carbon-dioxide containing exhaust to a separation assembly, the carbon-dioxide containing exhaust being one of anode exhaust output from the bottoming anode portion and a gas derived from the anode exhaust output from the bottoming anode portion; and
separating carbon dioxide from the carbon dioxide-containing exhaust using the separation assembly;
wherein the topping fuel cell assembly has a greater number of fuel cells than the bottoming fuel cell assembly so that the topping fuel cell assembly utilizes more fuel than the bottoming fuel cell assembly, and
wherein anode exhaust from each of the topping anode portions of the topping fuel cell modules is combined after exiting the respective topping anode portions, and the combined anode exhaust is received by the bottoming anode portion.

17. The method in accordance with claim 16, wherein the step of providing at least a portion of the flue gas comprises providing a portion of the flue gas output from the flue gas generating device to each of the topping cathode portion and the bottoming cathode portion in parallel.

18. The method in accordance with claim 16, wherein the step of providing at least a portion of the flue gas comprises providing the at least a portion of the flue gas output from the flue gas generating device to one of the topping cathode portion and the bottoming cathode portion to generate cathode exhaust, and further comprising conveying the cathode exhaust generated in the one of the topping cathode portion and bottoming cathode portion to the other one of the topping cathode portion and the bottoming cathode portion.

19. The method in accordance with claim 18, wherein the step of providing at least a portion of the flue gas comprises providing the at least a portion of the flue gas output from the flue gas generating device to the topping cathode portion to generate cathode exhaust, and wherein the cathode exhaust generated in the topping cathode portion is conveyed to the bottoming cathode portion.

20. The method in accordance with claim 16, wherein the step of providing at least a portion of the flue gas comprises providing the flue gas to the topping cathode portion and the bottoming cathode portion in parallel or in series, and the method further comprises controlling the flow of the flue gas to the topping cathode portion and the bottoming cathode portion to be in parallel or in series.

21. The method in accordance with claim 16, wherein:
the carbon dioxide-containing exhaust is anode exhaust output from the bottoming anode portion,
the step of separating comprises separating carbon dioxide from the anode exhaust using the separation assembly and outputting separated carbon dioxide and separately outputting separated anode exhaust with a reduced amount of carbon dioxide, and
the method further comprises recycling the separated anode exhaust to the topping anode portion for use as fuel.

22. The method in accordance with claim 21, further comprising bleeding off a small amount of the separated anode exhaust to remove inert gases prior to the step of recycling the separated anode exhaust.

23. The method in accordance with claim 16, further comprising:
oxidizing anode exhaust output from the bottoming anode portion with one or more of air and oxygen to generate the carbon dioxide-containing exhaust and to generate waste heat; and
utilizing the waste heat generated in the oxidizing step to heat the flue gas before the flue gas is provided to the at least one of the topping and bottoming cathode portions in the providing step,
wherein the step of separating comprises separating carbon dioxide from the carbon dioxide-containing exhaust generated in the oxidizing step and outputting separated carbon dioxide and separately outputting a separated gas with a reduced amount of carbon dioxide.

24. The method of claim 16, wherein the step of separating comprises cooling the carbon dioxide-containing exhaust to separate water from the carbon dioxide-containing exhaust and to output a water separated carbon dioxide containing exhaust, and separating carbon dioxide from the water separated carbon dioxide containing exhaust to output a separated gas with a reduced carbon dioxide content and to separately output carbon dioxide suitable for one or more of sequestration and external use.

25. The method in accordance with claim 24, wherein the separating of carbon dioxide from the water separated carbon dioxide is performed using one or more of compression and cryogenic cooling to generate liquid carbon dioxide, solvent washing, and a membrane process.

26. The method in accordance with claim 16, further comprising controlling the flow rate of the flue gas to the one or more of the topping cathode portion and bottoming cathode portion to support a fuel cell cathode side electrochemical reaction in each of the topping and bottoming fuel cell assemblies and to achieve an overall CO2 utilization of 50% or greater.

27. The method in accordance with claim 16, further comprising controlling the flow rates of flue gas and fuel through the topping fuel cell assembly and bottoming fuel cell assembly so that pressures between the topping anode portion and the topping cathode portion are balanced and the pressures between the bottoming anode portion and the bottoming cathode portion are balanced.

28. The method in accordance with claim 16, wherein overall fuel utilization by the high efficiency fuel cell system is 80% or greater.

29. The method in accordance with claim 16, further comprising:

supplying supplemental fuel to the bottoming anode portion; and controlling the amount of supplemental fuel supplied to the bottoming anode portion so as to control the amount of current generated in the bottoming fuel cell assembly.

30. The method in accordance with claim 16, further comprising controlling one or more of:

(a) the amount of current generated in the topping and bottoming fuel cell assemblies so that as operating time of the high efficiency fuel cell system increases, the amount of current generated by the topping fuel cell assemblies decreases and the amount of current generated by the bottoming fuel cell assemblies increases;

(b) the amount of current generated in the bottoming fuel cell assembly based on electricity needs so that the amount of current generated in the bottoming fuel cell assembly is increased when the electricity need increases;

(c) the flow of the flue gas to be conveyed to the topping fuel cell assembly and to the bottoming fuel cell assembly in parallel or in series;

(d) the flow rate of flue gas to the topping fuel cell assembly and to the bottoming fuel cell assembly to achieve a predetermined overall CO2 utilization;

(e) the pressure between the anode and cathode portions in the topping fuel cell module and the bottoming fuel cell module such that the pressure is balanced;

(f) the amount of fuel feed provided to each of the first and second topping fuel cell modules;

(g) the amount of supplemental fuel provided to the bottoming fuel cell assembly;

(h) recycling of a remaining exhaust with a reduced carbon dioxide concentration output from the separation assembly to the topping anode portion; and (i) the amount of supplemental air supplied to one or more of the topping cathode portion and the bottoming cathode portion so as to control the temperature and concentration of carbon dioxide and oxygen in a cathode inlet gas conveyed to the one or more of the topping cathode portion and the bottoming cathode portion.

* * * * *